United States Patent
Atsuumi et al.

(10) Patent No.: US 10,783,606 B2
(45) Date of Patent: Sep. 22, 2020

(54) IMAGE DISPLAY APPARATUS AND VEHICLE

(71) Applicants: Hiromichi Atsuumi, Kanagawa (JP); Yuki Hayashi, Kanagawa (JP); Daisuke Ichii, Kanagawa (JP); Naoki Nakamura, Saitama (JP)

(72) Inventors: Hiromichi Atsuumi, Kanagawa (JP); Yuki Hayashi, Kanagawa (JP); Daisuke Ichii, Kanagawa (JP); Naoki Nakamura, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 91 days.

(21) Appl. No.: 15/346,133

(22) Filed: Nov. 8, 2016

(65) Prior Publication Data

US 2017/0154406 A1 Jun. 1, 2017

(30) Foreign Application Priority Data

Nov. 27, 2015 (JP) .................................. 2015-232260

(51) Int. Cl.
*G06T 3/00* (2006.01)
*B60K 35/00* (2006.01)
(Continued)

(52) U.S. Cl.
CPC .............. *G06T 3/005* (2013.01); *B60K 35/00* (2013.01); *G02B 26/105* (2013.01);
(Continued)

(58) Field of Classification Search
CPC .......... G02B 27/01–27/0198; G02B 2027/013; B60K 2350/2052; B60K 2350/2065; G09G 3/025; G06T 3/005
See application file for complete search history.

(56) References Cited

U.S. PATENT DOCUMENTS

| 2012/0169752 | A1* | 7/2012 | Kurozuka | ............ | G02B 26/101 |
| | | | | | 345/545 |
| 2013/0050655 | A1* | 2/2013 | Fujikawa | ........... | G02B 27/0101 |
| | | | | | 353/38 |

(Continued)

FOREIGN PATENT DOCUMENTS

| JP | 2013-025205 | 2/2013 |
| JP | 2016-136222 | 7/2016 |
| JP | 2016-170185 | 9/2016 |

OTHER PUBLICATIONS

U.S. Appl. No. 15/188,028, filed Jun. 21, 2016.
U.S. Office Action issued in U.S. Appl. No. 16/255,575 dated Apr. 11, 2019.

*Primary Examiner* — Michelle M Iacoletti
*Assistant Examiner* — Christopher A Lamb, II
(74) *Attorney, Agent, or Firm* — Oblon, McClelland, Maier & Neustadt, L.L.P.

(57) ABSTRACT

An image display apparatus includes an image forming unit and a vehicle provided with the image display apparatus. The image forming unit includes a light source unit configured to emit light, an optical scanner configured to scan the light emitted from the light source unit two-dimensionally in a main scanning direction and a sub-scanning direction, and an intermediate image forming unit configured to form an intermediate image by the light scanned by the optical scanner. The image forming unit satisfies 0.3<Rm/L<3, where Rm denotes a radius of curvature of the intermediate image forming unit in the main scanning direction, and L denotes distance between a reference point when the optical scanner deflects and scans the light and a center of the intermediate image formed on the intermediate image forming unit. In the vehicle, the image display apparatus indicates the intermediate image to a driver as a virtual image.

12 Claims, 12 Drawing Sheets

(51) Int. Cl.
    *G02B 26/10*        (2006.01)
    *G02B 27/01*        (2006.01)
    *G09G 3/02*         (2006.01)
    *G02B 27/10*        (2006.01)
    *G02B 27/28*        (2006.01)
    *G02B 30/26*        (2020.01)
    *G09G 3/00*         (2006.01)

(52) U.S. Cl.
    CPC ..... *G02B 27/0101* (2013.01); *G02B 27/0149* (2013.01); *G02B 27/106* (2013.01); *G02B 27/283* (2013.01); *G02B 30/26* (2020.01); *B60K 2370/31* (2019.05); *B60K 2370/334* (2019.05); *B60K 2370/70* (2019.05); *G02B 2027/0141* (2013.01); *G09G 3/002* (2013.01); *G09G 3/025* (2013.01); *G09G 2380/10* (2013.01); *G09G 2380/12* (2013.01)

(56) References Cited

U.S. PATENT DOCUMENTS

| | | | |
|---|---|---|---|
| 2015/0009550 A1* | 1/2015 | Misago | B60K 35/00 359/205.1 |
| 2016/0116735 A1 | 4/2016 | Hayashi et al. | |
| 2016/0266384 A1 | 9/2016 | Nakamura et al. | |
| 2016/0320615 A1 | 11/2016 | Nakamura et al. | |
| 2016/0320616 A1 | 11/2016 | Ichii | |
| 2018/0284441 A1* | 10/2018 | Cobb | G02B 5/02 |

* cited by examiner

IMAGE DISPLAY APPARATUS AND VEHICLE

CROSS-REFERENCE TO RELATED APPLICATION

This patent application is based on and claims priority pursuant to 35 U.S.C. § 119(a) to Japanese Patent Application No. 2015-232260, filed on Nov. 27, 2015, in the Japan Patent Office, the entire disclosure of which is hereby incorporated by reference herein.

BACKGROUND

Technical Field

Embodiments of the present invention relate to an image display apparatus and a vehicle provided with the image display apparatus.

Background Art

Image display apparatuses are known in the art that are provided for mobile objects such as vehicles, aircrafts, and ships, and are used by the drivers of these mobile objects to visually recognize useful information for driving or operating the mobile objects with minimum line-of-sight movement. Such image display apparatuses are called heads-up display (HUD) in the art.

A HUD forms an image that includes the information related to a mobile object as an intermediate image, and displays the formed intermediate image in the viewing field of the driver as a virtual image. The "information related to a mobile object" includes, for example, the information about objects existing in the viewing field of the driver of the mobile object, the information useful for safe and comfortable driving, and an alert to inform the driver of the operational status of the mobile object.

Some methods are known in the art as a method for forming an intermediate image in HUDs. For example, a panel system where an intermediate image is formed by an imaging device such as a liquid crystal and a laser scanning system where an intermediate image is formed by scanning a laser beam emitted from a laser diode by a two-dimensional scanning device are known in the art. In the panel system, full-screen light emission is partially blocked to form an intermediate image. In the laser scanning system, each pixel is assigned to either "emitting" pixel and "non-emitting" pixel to form an intermediate image.

A HUD projects the intermediate image formed by an image forming unit onto a transmission and reflection member called combiner to display a virtual image. Currently, HUDs utilizes a front windshield or the like as a combiner. As a front windshield has a curved surface, the plane on which an intermediate image is projected is also curved. In order to display a virtual image with high visual recognizability on a curved imaging plane, HUDs where an optical element with power is disposed between the image forming unit and the optical scanner are known in the art.

SUMMARY

Embodiments of the present invention described herein provide an image display apparatus including an image forming unit. The image forming unit includes a light source unit configured to emit light, an optical scanner configured to scan the light emitted from the light source unit two-dimensionally in a main scanning direction and a sub-scanning direction, and an intermediate image forming unit configured to form an intermediate image by the light scanned by the optical scanner. The image forming unit satisfies $0.3 < Rm/L < 3$, where Rm denotes a radius of curvature of the intermediate image forming unit in the main scanning direction, and L denotes distance between a reference point when the optical scanner deflects and scans the light and a center of the intermediate image formed on the intermediate image forming unit.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
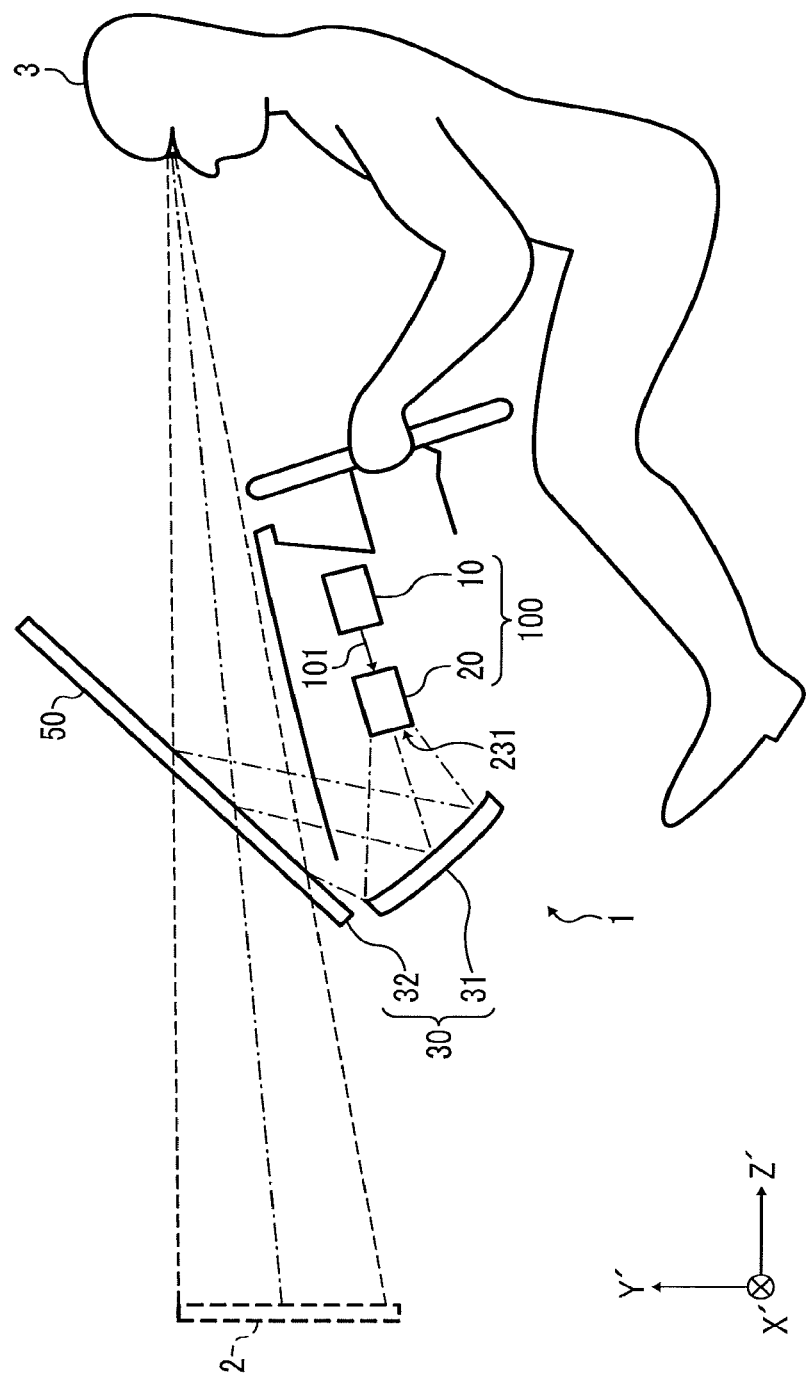
FIG. 1 is a schematic diagram of an image display apparatus according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

<Outline of Image Display Apparatus>

Hereinafter, an image display apparatus according to an embodiment of the present invention is described with reference to the drawings. Firstly, an overall configuration of a heads-up display (HUD) 1 according to the present embodiment is described with reference to FIG. 1.

FIG. 1 is a schematic diagram of the image display apparatus according to the present embodiment.

In the present embodiment, cases in which the HUD 1 is installed in a vehicle are described. The HUD 1 is an image display apparatus that displays information useful for a driver 3 of the vehicle within the viewing field of the driver 3 so as to be visually recognizable as a virtual image 2. The "information useful for the driver 3" includes, for example, the information related to an object existing in the viewing field of the driver, and the information related to the operation of the vehicle. The "information useful for the driver 3" also includes, for example, an alert that notifies the driver 3 of an abnormal operational of the vehicle. In the present description, the "information useful for the driver 3" may be referred to simply as "information".

In the present embodiment, a front windshield 50 of the vehicle is used as an optical combiner 32 onto which an intermediate image 231, as will be described later, is projected. The front windshield 50 that serves as the optical combiner 32 reflects the projected intermediate image 231 towards the driver 3, and passes through the light (extraneous light) from the ambient environment or an object existing in the viewing field of the driver 3. Note that an additional transmissive and reflective optical element, which is independent of the front windshield 50, may be disposed so as to serve as the optical combiner 32 in the HUD 1.

As illustrated in FIG. 1, the HUD 1 includes a light source unit 10, a scanning optical system 20, and an observation optical system 30. The light source unit 10 and the scanning optical system 20 together form an image forming unit 100.

As the intermediate image 231 is formed by the image forming unit 100 on a concave mirror 31 side that forms a part of the observation optical system 30, the intermediate image 231 is reflected by the concave mirror 31 and is projected onto the optical combiner 32. The optical combiner 32 is a combining optical element that combines the intermediate image 231 and the above extraneous light such that the driver 3 can visually recognize the virtual image 2.

<Outline of Light Source Unit 10>

The light source unit 10 emits a laser-beam bundle that forms the intermediate image 231, and the intermediate image 231 later forms the virtual image 2. If it is desired that the virtual image 2 be a color image, the light source unit 10 emits a laser-beam bundle that corresponds to the trichromatic colors of light required for forming a color image.

<Outline of Scanning Optical System 20>

The scanning optical system 20 forms the intermediate image 231 according to the laser-beam bundle emitted from the light source unit 10, and the formed intermediate image 231 indicates prescribed information on the virtual image 2. The scanning optical system 20 emits the formed intermediate image 231 towards the observation optical system 30. Note also that the external shape of the intermediate image 231 is a rectangle in many cases.

<Outline of Observation Optical System 30>

The intermediate image 231 that is formed and emitted from the scanning optical system 20 is magnified by the concave mirror 31 that is a reflective optical element of the observation optical system 30, and is projected onto the optical combiner 32. The intermediate image 231 that is magnified and projected is reflected by the optical combiner 32 towards the driver 3.

When the intermediate image 231 is reflected by the optical combiner 32, the virtual image 2 appears in the visual perception of the driver 3 at a position different from the physical position of the optical combiner 32 in a direction away from the driver 3. As described above, the information that can be recognized from the virtual image 2 relates to the operation of the vehicle, and is, for example, the speed or mileage of the vehicle, and the navigation information such as destination display.

Note that the viewpoint of the driver 3 merely indicates a reference position (reference eye point). It is assumed that the range of the viewpoint of the driver 3 is equal to or less than the eye range of driver of the vehicle (JIS D 0021).

Here, the "directions" in the description of the present embodiment are defined. The intermediate image 231 is formed by the two-dimensional scanning that is performed by the scanning optical system 20, and such two-dimensional scanning includes main scanning and sub-scanning. The main-scanning direction when the intermediate image 231 is formed is referred to as the "X direction", and the sub-scanning direction is referred to as the "Y direction". In the present embodiment, the horizontal directions of the virtual image 2 that the driver 3 visually recognizes are referred to as the main scanning direction (X direction) on the intermediate image 231, and the vertical directions of the virtual image 2 are referred to as the sub-scanning direction (Y direction) on the intermediate image 231. Even if the physical directions vary, the horizontal directions of the virtual image 2 are referred to as the X direction assuming that the horizontal directions correspond to the main scanning directions of the intermediate image 231. In a similar manner, even if the physical directions vary, the vertical directions of the virtual image 2 are referred to as the Y direction assuming that the vertical directions correspond to the sub-scanning directions of the intermediate image 231.

When the HUD 1 is installed in a vehicle, as illustrated in FIG. 1, the directions of travel of the vehicle, the right and left directions of the vehicle, and the up-and-down directions of the vehicle are referred to as the "Z' direction", "X' direction", and the "Y' direction", respectively. In this case, the direction from the virtual image 2 to the driver 3 (i.e., the backward direction of the vehicle) is referred to as the +Z' direction, and the line-of-sight direction of the driver 3 (i.e., the direction of travel of the vehicle) is referred to as the −Z' direction. The right direction of the driver 3 (i.e., the back-side direction of the paper on which FIG. 1 is drawn) is referred to as the +X' direction, and the left direction of the driver 3 (i.e., the front-side direction of the paper on which FIG. 1 is drawn) is referred to as the −X' direction. Moreover, the upper direction of the driver 3 is referred to as the +Y' direction, and the lower direction of the driver 3 is referred to as the −Y' direction.

In FIG. 1, the X directions of the virtual image 2 match the X' directions (right and left directions) of the vehicle. Moreover, the Y directions of the virtual image 2 match the Y' directions (upper and lower directions) of the vehicle. On the other hand, the X directions (i.e., the main scanning directions) of the intermediate image 231 that is generated by the scanning optical system 20 do not always match the X' directions (right and left directions) of the vehicle. In a similar manner, the Y directions (i.e., the sub-scanning directions) of the intermediate image 231 do not always match the Y' directions (upper and lower directions) of the vehicle. This is because due to the arrangement or directions of the optical elements of the scanning optical system 20 and the optical arrangement of the scanning optical system 20 and the observation optical system 30, the physical directions of the main scanning directions and the sub-scanning directions of the intermediate image 231 are not always orthogonal to the X' axis, the Y' axis, and the Z' axis.

<Example Configuration of Light Source Unit>

Next, an example configuration of the light source unit 10 is described in detail with reference to FIG. 2.

Figure 2:
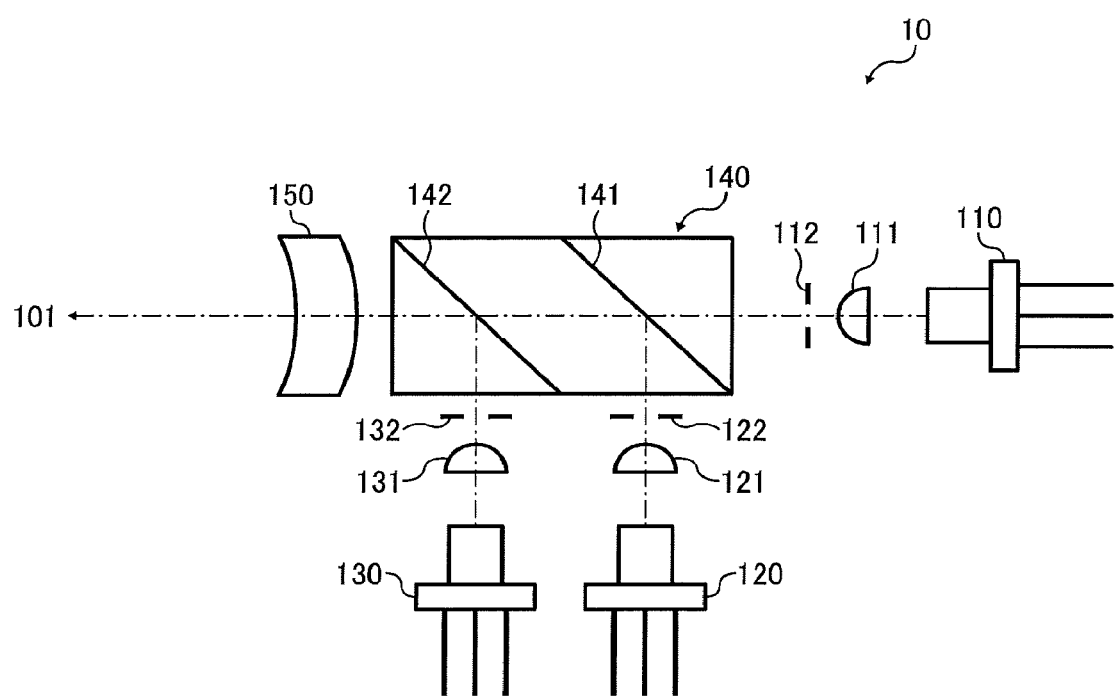
FIG. 2 is a schematic diagram of a light source unit in the image display apparatus of FIG. 1.

FIG. 2 is a schematic diagram of the light source unit 10 in the image display apparatus of FIG. 1.

In order to make the virtual image 2 become a color image, the light source unit 10 combines the light beams of the trichromatic colors of light into one bundle and emits the combined bundle of light beams. In the following description of the present embodiment, the light beam that is emitted from the light source unit 10 and heads for the optical scanner, as will be described later, is referred to as a first light beam 101.

The light source unit 10 includes, for example, three semiconductor laser devices. These three semiconductor laser devices are the elements of the light source each of which corresponds to one of the trichromatic colors of light. The first laser device 110 emits red (R) laser beams. The second laser device 120 emits green (G) laser beams. The third laser device 130 emits blue (B) laser beams.

Note also that laser diodes (LDs) or vertical-cavity surface-emitting lasers (VCSEL), which are called end-surface emitting laser, may be used as the laser devices. Alternatively, light-emitting diode (LED) devices may be used instead of the semiconductor laser devices.

In addition to the laser devices, the light source unit 10 is provided with coupling lenses that control the divergence of the laser beams emitted from the laser devices. Moreover, the light source unit 10 is provided with apertures that restrict and shape the diameters of the laser-beam bundles passed through the coupling lenses. Further, the light source unit 10 is provided with a beam combining prism 140 and a lens 150 that combine and emit the laser-beam bundles of each color that are shaped by the apertures.

The coupling lenses that correspond to the laser devices of each color are referred to as a first coupling lens 111, a second coupling lens 121, and a third coupling lens 131.

The apertures that correspond to the laser devices are referred to as a first aperture 112, a second aperture 122, and a third aperture 132.

The beam combining prism 140 includes a first dichroic film 141 that transmits red laser beams and reflects green laser beams, and a second dichroic film 142 that transmits red and green laser beams and reflects blue laser beams.

The lens 150 transforms the light beams emitted from the beam combining prism 140 into beams in a desired concentrated state.

The wavelength $\lambda R$ of the laser-beam bundle (laser beams) that is emitted from the first laser device 110 is, for example, 640 nanometer (nm). The wavelength $\lambda G$ of the laser-beam bundle (laser beams) that is emitted from the second laser device 120 is, for example, 530 nm. The wavelength $\lambda B$ of the laser-beam bundle (laser beams) that is emitted from the third laser device 130 is, for example, 445 nm.

The red laser beam that is emitted from the first laser device 110 passes through the first coupling lens 111 and the first aperture 112, and enters the beam combining prism 140. The red laser beam that has entered the beam combining prism 140 passes through the first dichroic film 141 and traveling in a straight line.

The green laser beam that is emitted from the second laser device 120 passes through the second coupling lens 121 and the second aperture 122, and enters the beam combining prism 140. The green laser beam that has entered the beam combining prism 140 is reflected by the first dichroic film 141 and travels in the same direction as the red laser beam (i.e., towards the second dichroic film 142).

The blue laser beam that is emitted from the third laser device 130 passes through the third coupling lens 131 and the third aperture 132, and enters the beam combining prism 140.

The blue laser beam that has entered the beam combining prism 140 is reflected by the second dichroic film 142 and travels in the same direction as the red laser beam and the green laser beam.

As described above, the combined light beams of the red laser beam, the green laser beam, and the blue laser beam are emitted from the beam combining prism 140.

The light beams that are emitted from the beam combining prism 140 are transformed by the lens 150 into the first light beam 101, which are beams in a desired concentrated state. The first light beam 101 is formed by combining the red laser beam, the green laser beam, and the blue laser beam together as one laser-beam bundle.

The intensity of the laser-beam bundles of R (red), G (green), and B (blue) that are included in the first light beam 101 is modulated according to the picture signal of a two-dimensional color image to be displayed. Alternatively, intensity modulation may be performed according to the image data of a two-dimensional color image to be displayed.

The intensity modulation of the laser-beam bundle may be performed through direct modulation in which the semiconductor laser of each color is directly modulated or through external modulation in which the laser-beam bundle emitted from the semiconductor laser of each color is modulated.

Note also that the apertures may have various kinds of shapes such as a circle, an ellipse, a rectangle, and a square according to the divergence angle of a laser-beam bundle. The lens 150 is a meniscus lens that has a concave surface towards a MEMS mirror 21 as will be described later.

<Example Configuration of Scanning Optical System 20>

Figure 3:
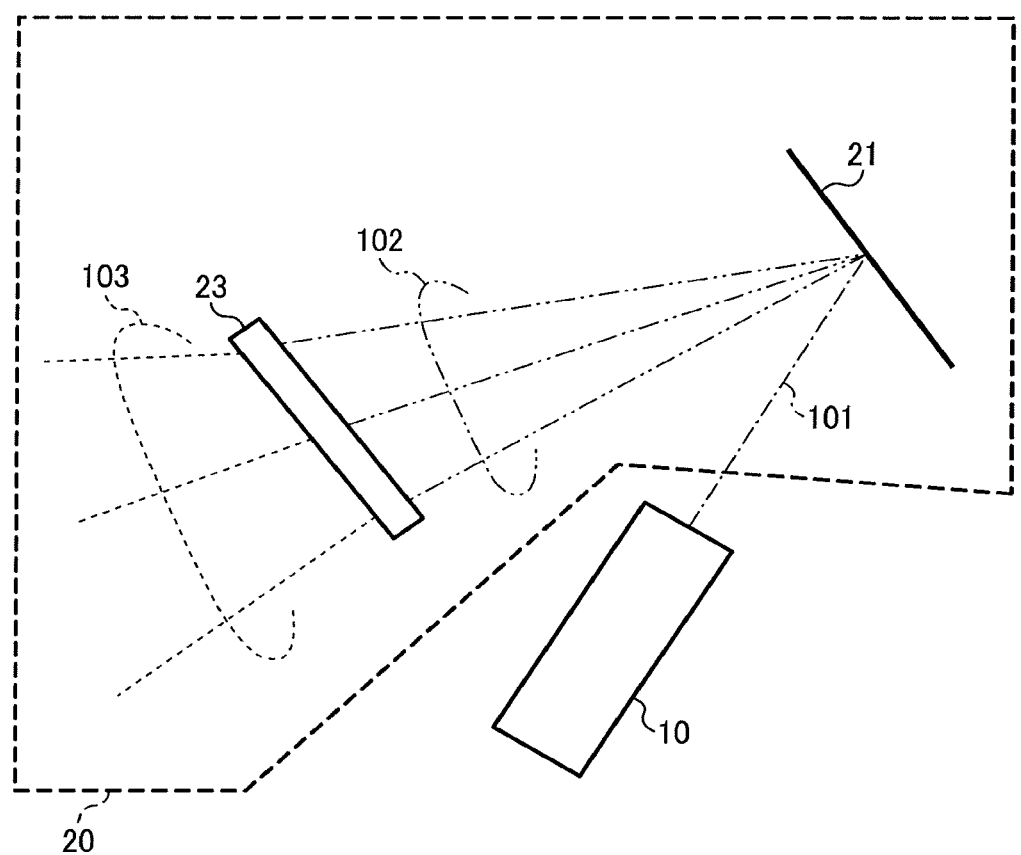
FIG. 3 is a schematic diagram of a scanning optical system in the image display apparatus of FIG. 1.

FIG. 3 is a schematic diagram of the scanning optical system 20 in the image display apparatus of FIG. 1.

As illustrated in FIG. 3, the scanning optical system 20 includes a MEMS mirror 21 that deflects the first light beam 101, and a microlens array 23 that serves as an intermediate image forming unit. In the scanning optical system 20, the MEMS mirror 21 deflects the first light beam 101 emitted from the light source unit 10 to form a second light beam 102, and the second light beam 102 enters the microlens array 23. The microlens array 23 is two-dimensionally scanned in the main scanning directions and the sub-scanning directions by the second light beam 102 that has been deflected by the MEMS mirror 21. The intermediate image 231 is formed as the microlens array 23 is two-dimensionally scanned. An image light (light for projecting an image) 103 according to the formed intermediate image 231 is emitted from the exit plane of the microlens array 23, and heads for the observation optical system 30.

Figure 11:
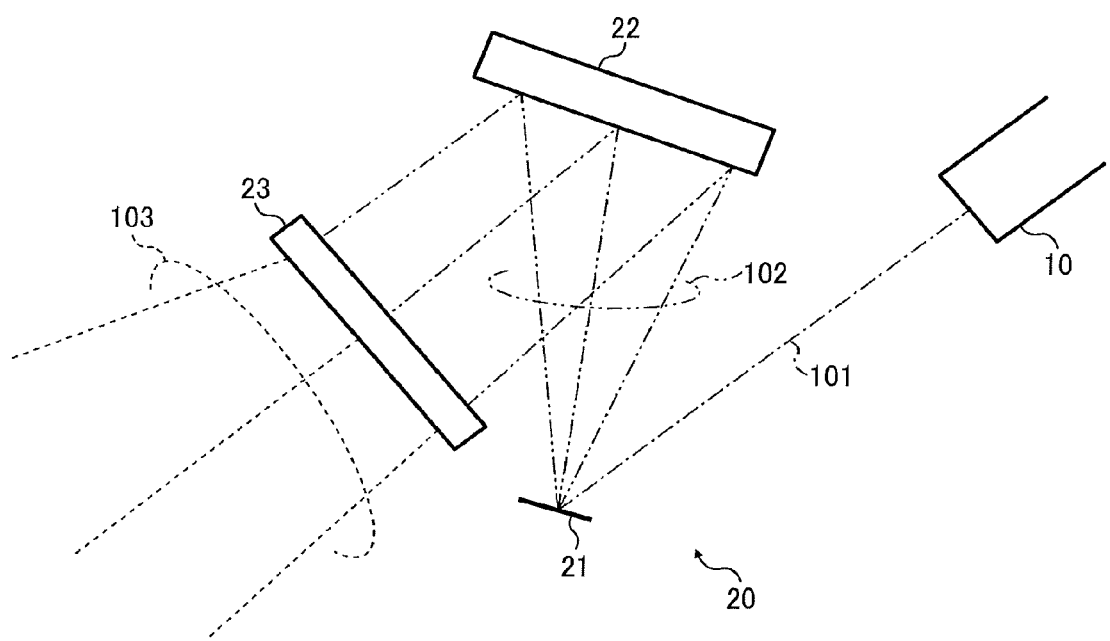
FIG. 11 is a schematic diagram illustrating an alternative embodiment of a scanning optical system according to the image display apparatus of FIG. 1.

FIG. 11 is a schematic diagram illustrating an alternative embodiment of the scanning optical system 20 in the image display apparatus of FIG. 1.

Note also that as illustrated in FIG. 11, the scanning optical system 20 may include a plane mirror 22 between the MEMS mirror 21 and the microlens array 23.

<MEMS mirror 21>

Next, the MEMS mirror 21 is described in detail. The MEMS mirror 21 is an image forming element that deflects and scans the first light beam 101 emitted from the light source unit 10 and two-dimensionally deflects and scans the microlens array 23. The MEMS mirror 21 consists of micro-electromechanical systems (MEMS) that are manufactured by semiconductor processes or the like as a minute pivoting mirror element.

Figure 4:
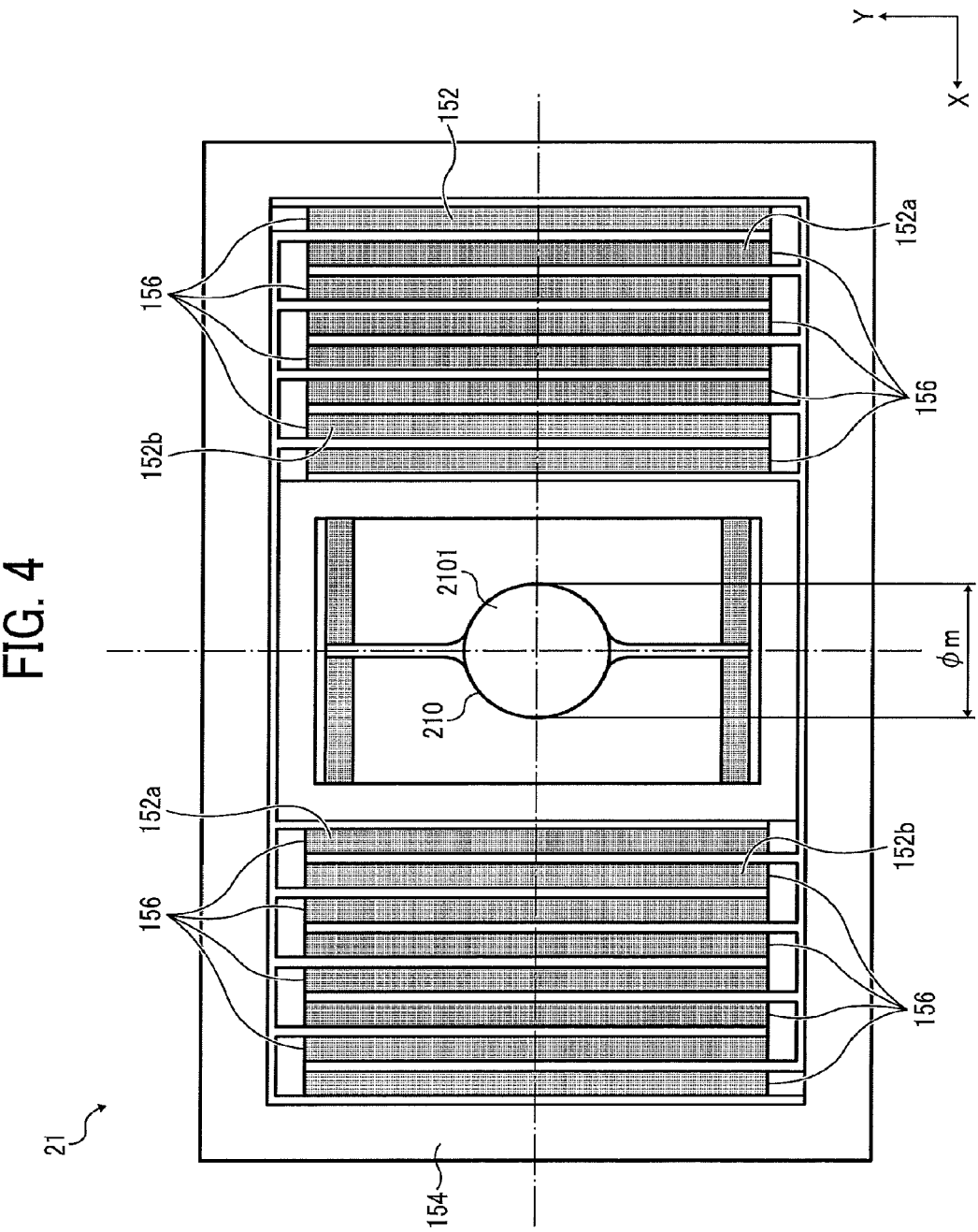
FIG. 4 is a plan view of an optical scanner in the image display apparatus of FIG. 1.

FIG. 4 is a plan view of an optical scanner in the image display apparatus of FIG. 1.

As illustrated in FIG. 4, the external shape of the MEMS mirror 21 is rectangular, and the MEMS mirror 21 is provided with a micromirror 210 in the center. The micromirror 210 has a reflection plane 2101, and the reflection plane 2101 serves as an optical scanner.

The reflection plane 2101 of the micromirror 210 two-dimensionally deflects the first light beam 101. The reflection plane 2101 is configured to rotate around two axes. When the reflection plane 101 rotates around the axis in the Y direction, direction of travel of the second light beam 102 is changed in the X direction. Accordingly, when the reflection plane 2101 rotates around the axis in the Y direction, main scanning for forming the intermediate image 231 is performed. When the reflection plane 2101 rotates around the axis in the X direction, direction of travel of the second light beam 102 is changed in the Y direction. Accordingly, when the reflection plane 2101 rotates around the axis in the X direction, sub-scanning for forming the intermediate image 231 is performed. In other words, the X direction and the Y direction in FIG. 4 correspond to the main scanning direction and the sub-scanning direction, respectively.

The MEMS mirror 21 performs sinusoidal oscillation in the main scanning direction, and performs sawtooth oscillation in the sub-scanning direction. By so doing, the MEMS mirror 21 deflects and scans the microlens array 23 two-dimensionally.

On both sides of the micromirror 210 in the X direction, a pair of serpentine beams 152 including a plurality of turning portions are arranged. The serpentine beams 152 are divided into first beams 152a and second beams 152b that alternate and are adjacent to each other, and each of the first beams 152a and the second beams 152b are provided with a piezoelectric member 156. The piezoelectric member 156 used here is, for example, lead zirconate titanate (PZT).

The first beams 15a and the second beams 152b, which are adjacent to each other, are independently applied with different voltage. These voltages that are independently applied as above have voltage values that are different from each other. As the first beams 152a and the second beams 152b are independently applied with different voltage, each of the first beams 152a and the second beams 152b are differently curved. The direction of the curve is determined by the applied voltage. In other words, the first beams 152a and the second beams 152b, which are adjacent to each other, are curved at different angles. Note also that the serpentine beams 152 are supported by a frame member 154.

As the above deformation (curve) is accumulated, the micromirror 210 rotates in such a manner that the angle of the reflection plane 2101 changes around the axis in the X direction. The first light beam 101 is reflected due to the rotation of the reflection plane 2101 around the axis in the X direction, and the second light beam 102 scans the microlens array 23 in the Y direction.

Due to the use of the MEMS mirror 21 that is configured as above, the HUD 1 can perform optical scanning in the vertical direction (Y direction), where the axis in the X direction is the center of rotation, with low voltage. On the other hand, the optical scanning in the horizontal direction (X direction), where the axis in the Y direction is the center of rotation, is performed with resonance using, for example, a torsion bar that is connected to the micromirror 210.

<Microlens Array 23>

Next, the microlens array 23 is described in detail. In the microlens array 23, the lens surface on which minute convex lenses are arrayed in two dimensions serves as the incident plane, and the plane on the other side of the lens surface serves as the exit plane. However, no limitation is intended thereby, and for example, a diffusing board, a transmissive screen, and a reflective screen may be adopted for the optical element that is used for the microlens array 23. The microlens array 23 may be a plurality of microlenses that are one-dimensionally arranged or a plurality of microlenses that are three-dimensionally arranged.

The second light beam 102 that has entered the lens surface is diffused and emitted from the exit plane. For example, raster scanning in which high-speed scanning is performed in the main scanning direction and low-speed scanning is performed in the sub-scanning direction is performed by the MEMS mirror 21.

As described above, the first light beam 101 that is emitted from the light source unit 10 provided for the HUD 1 is compatible with color imaging. Accordingly, the intermediate image 231 that is formed on the microlens array 23 is a color image. Alternatively, the intermediate image 231 that is monochrome may be formed on the microlens array 23.

<Method of Forming Intermediate Image 231>

Figure 5:
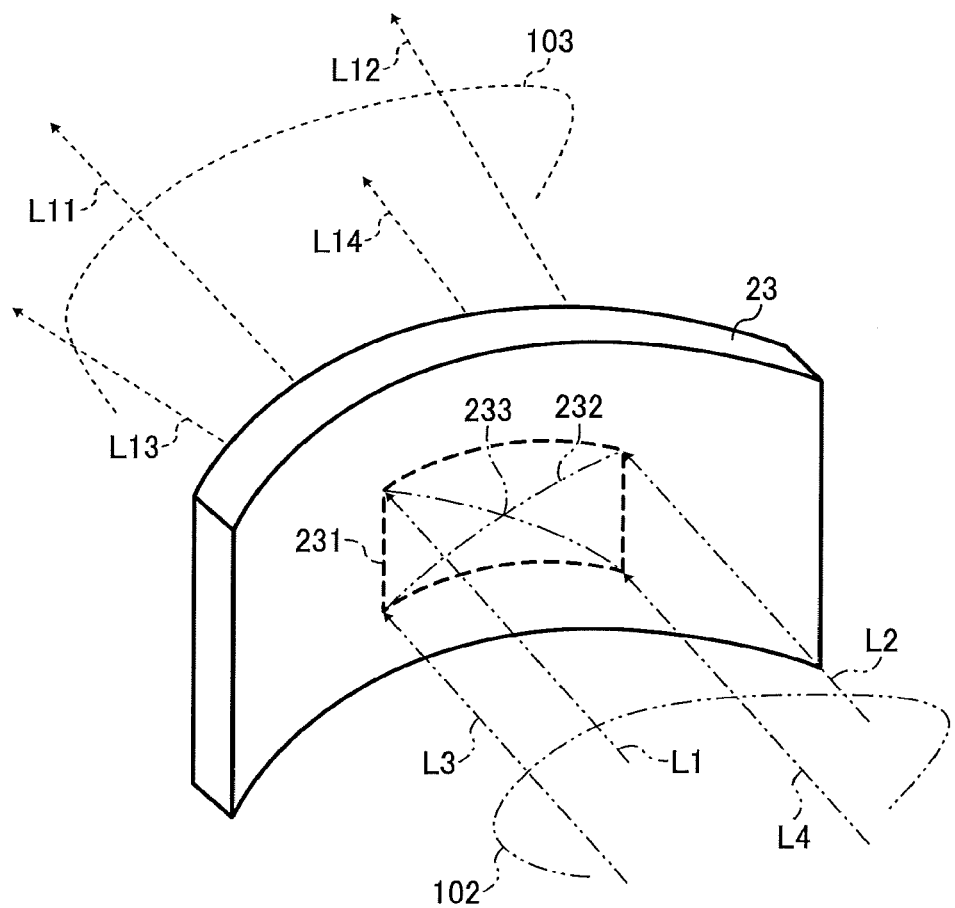
FIG. 5 is a perspective view of an intermediate image forming unit of the image display apparatus of FIG. 1.

FIG. 5 is a perspective view of the microlens array 23 when viewed from the incident direction of the second light beam 102, according to the present embodiment.

The microlens array 23 has a cylindrical shape that is bent only in the main scanning direction (X direction). In other words, the microlens array 23 has a concave surface on the lens surface side that the second light beam 102 enters, and a convex surface on the exit plane side from which the intermediate image 231 exits as the image light 103.

The rectangular region that is depicted by dotted line in FIG. 5 indicates the external shape of the intermediate image 231. Once the MEMS mirror 21 deflects and scans the first light beam 101, the second light beam 102 performs scanning in the main scanning direction from L1 to L2 illustrated in FIG. 5. Subsequently, scanning in the main scanning direction is performed again from a point one step lower than L1 in the sub-scanning direction. Finally, scanning in the main scanning direction is performed from L3 to L4 illustrated in FIG. 5, and one intermediate image 231 is formed. The intermediate image 231 is formed at a predetermined frame rate. When scanning for one frame of intermediate image 231 is completed, main scanning starts again from L1 to form the next frame of intermediate image 231.

The intermediate image 231 that is displayed on the microlens array 23 at each moment (at each frame rate) is formed only by the pixels that are being irradiated by the second light beam 102 at that time. In other words, the intermediate image 231 that is a two-dimensional color image is a set of pixels that are being scanned by the second light beam 102 two-dimensionally and displayed at each moment.

The area on which two-dimensional scanning is performed as described above is referred to as an effective scanning area 232. Moreover, the center of the effective scanning area 232 is referred to as a center 233 of the intermediate image 231. The intermediate image 231 that is formed in the effective scanning area 232 indicates the intermediate image 231 on the exit plane side of the microlens array 23 (i.e., on the observation optical system 30 side) as the image light 103.

<Control System of Image Forming Unit 100>

Here, the configuration of a control system that controls the operation of the image forming unit 100 provided for the HUD 1 is described.

Figure 6:
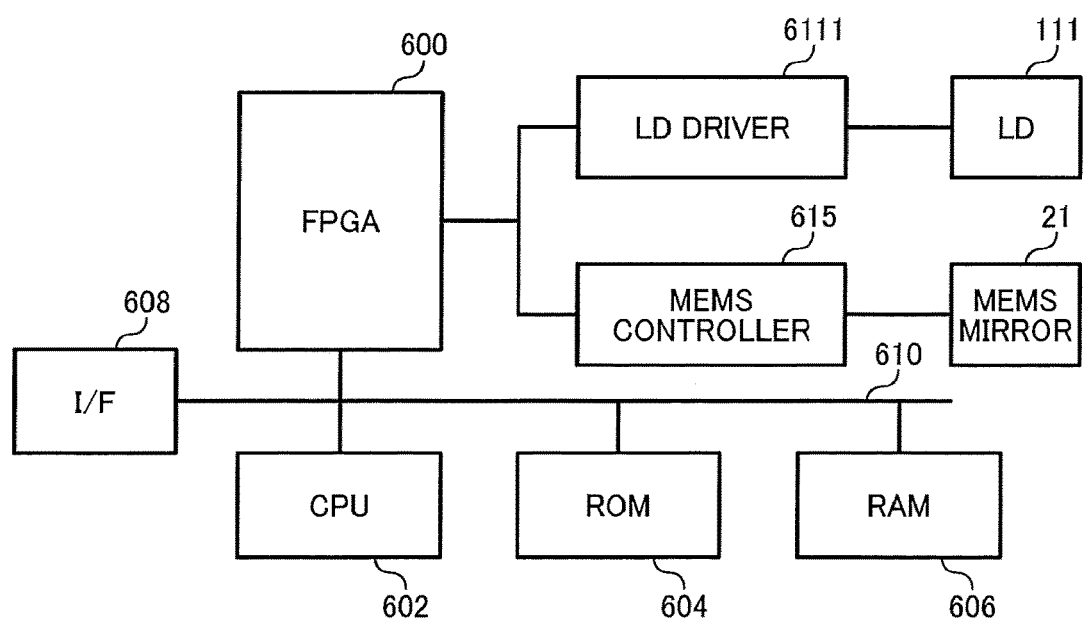
FIG. 6 is a block diagram of a hardware configuration of the image display apparatus of FIG. 1.

FIG. 6 is a block diagram of a hardware configuration of the image display apparatus of FIG. 1.

As illustrated in FIG. 6, the HUD 1 includes a field programmable gate array (FPGA) 600, a central processing unit (CPU) 602, a read only memory (ROM) 604, a random access memory (RAM) 606, an interface (I/F) 608, a bus line 610, a laser diode (LD) driver 6111, and a micro-electro-mechanical systems (MEMS) controller 615.

The FPGA 600 controls the LD driver 6111 or the MEMS controller 615 to operate the light source unit 10 and the MEMS mirror 21. The CPU 602 is a processing unit that controls the operation of the hardware elements provided for the HUD 1. The ROM 604 is a semiconductor memory that stores an image processing program that is executed by the CPU 602 to control the operation of the HUD 1. The RAM 606 is a semiconductor memory that the CPU 602 uses as a work area to control the hardware elements.

The interface 608 is a contact point between the HUD 1 and an external controller or the like. For example, the HUD 1 is connected to a controller area network (CAN) or the like through the interface 608. Accordingly, the HUD 1 can operate while communicating with an external controller or the like that is connected through the CAN.

<Functional Configuration of Image Forming Unit 100>

Next, the functional configuration of the image forming unit 100 provided for the HUD 1 is described.

Figure 7:
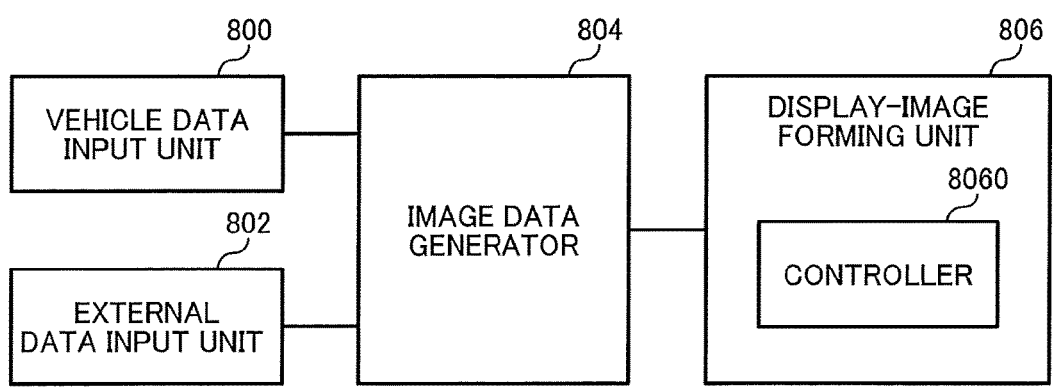
FIG. 7 is a functional block diagram of a functional configuration of the image display apparatus of FIG. 1.

FIG. 7 is a functional block diagram illustrating a functional configuration of the image display apparatus of FIG. 1.

As illustrated in FIG. 7, the image forming unit 100 includes a vehicle data input unit and an external data input unit 802, an image data generator 804, and a display-image forming unit 806.

The vehicle information input unit 800 obtains information such as the speed or mileage of the vehicle from an external controller or the like that is connected through the interface 608.

The external information input unit 802 obtains information such as the position information given by a global positioning system (GPS) and the traffic information given by a navigation system from an external controller or the like that is connected through the interface 608.

The image data generator 804 generates data for forming the intermediate image 231 according to the data input from the vehicle data input unit 800 and the external data input unit 802. The intermediate image 231 that later forms the virtual image 2 (see FIG. 1).

The display-image forming unit 806 is provided with a controller 8060. The controller 8060 controls the operation of the light source unit 10 or the scanning optical system 20 based on the data generated by the image data generator 804. Due to this control function, the intermediate image 231 that is projected onto the front windshield 50 is generated. According to the operation of the above functional blocks, a state in which the virtual image 2 is visually recognizable at the viewpoint of the driver 3 can be produced.

<Embodiment of Image Forming Unit 100>

Next, the features of the image forming unit 100 are described in detail. As described above, in the HUD 1, the microlens array 23 that serves as an intermediate image forming unit is curved in a specific direction. Accordingly, the intermediate image 231 in a good condition can be formed without arranging an optical element such as a free-form surface mirror between the microlens array 23 and the optical scanner.

Figure 8:
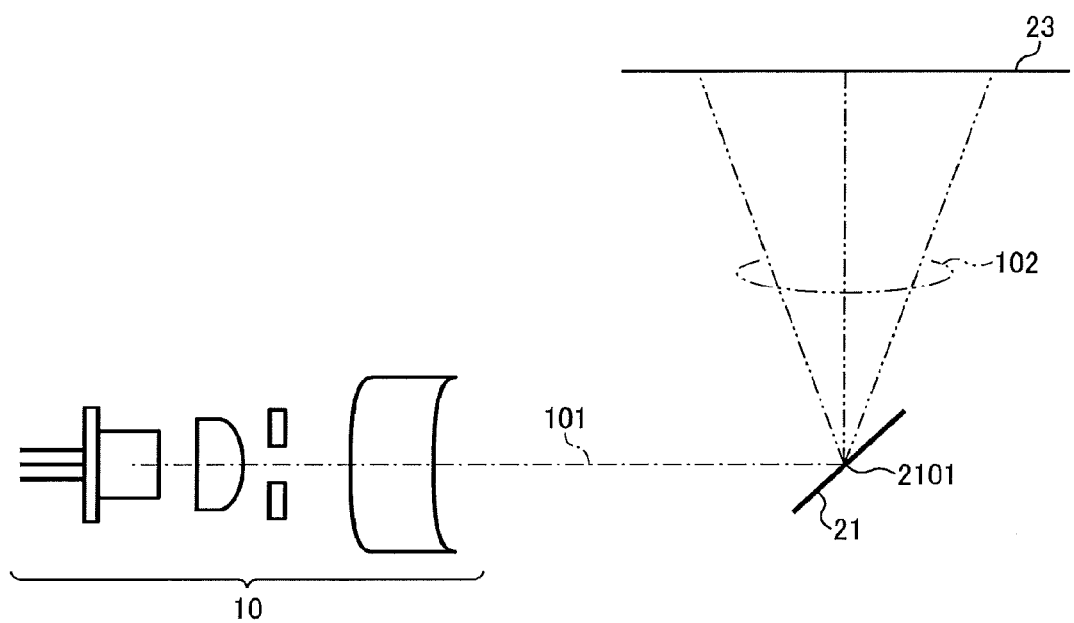
FIG. 8 is a diagram illustrating an optical arrangement of an image forming unit when viewed from the sub-scanning direction, according to the image display apparatus of FIG. 1.

FIG. 8 is a diagram illustrating the optical arrangement of the image forming unit 100 when viewed from the sub-scanning direction (X direction), according to the present embodiment.

In FIG. 8, the light source unit 10, the reflection plane 2101 that serves as an optical scanner, and the plane of the microlens array 23 that serves as an intermediate image forming unit on the light entering side in the image forming unit 100 are illustrated. As described above, the first light beam 101 that is emitted from the light source unit 10 is two-dimensionally scanned by the reflection plane 2101 of the MEMS mirror 21, and then the second light beam 102 reaches the microlens array 23 that is a light transmission member. The microlens array 23 is bent only in the main scanning direction and not bent in the sub-scanning direction.

Figure 9:
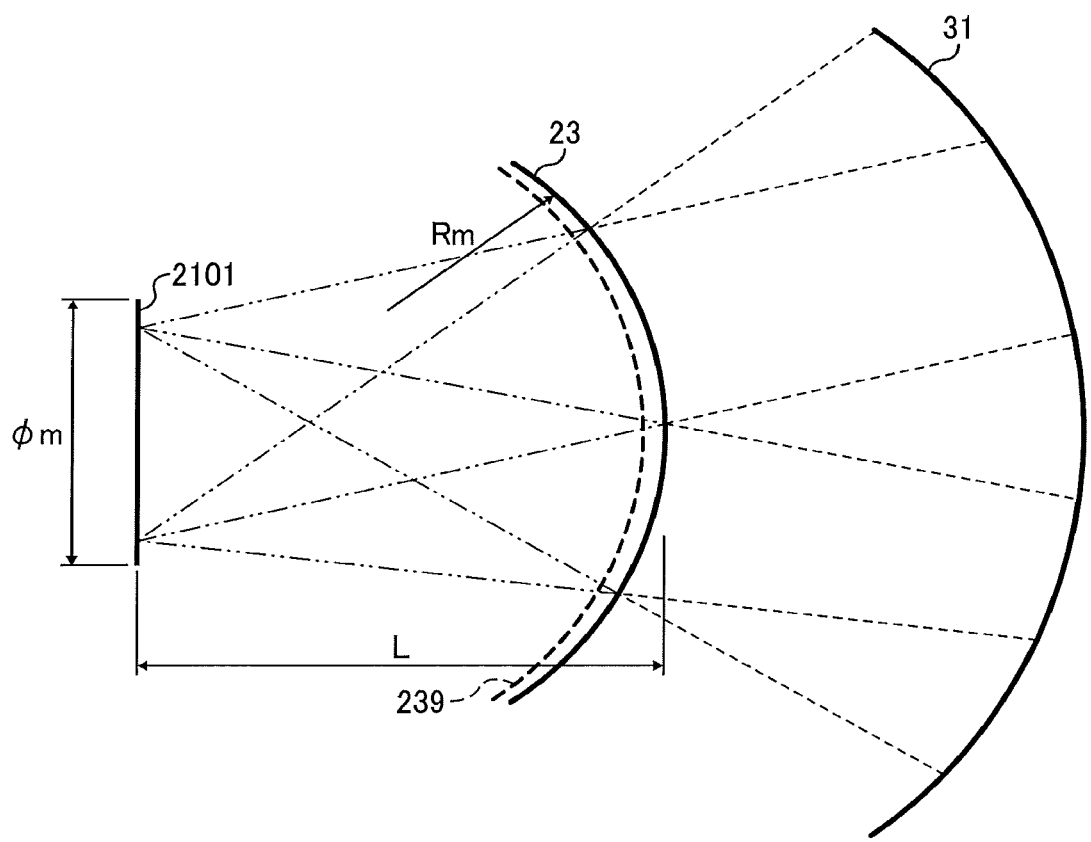
FIG. 9 is a diagram illustrating an optical arrangement of an image forming unit when viewed from the main scanning direction, according to the image display apparatus of FIG. 1.

FIG. 9 is a diagram illustrating the optical arrangement of the image forming unit 100 of the image display apparatus of FIG. 1 in the main scanning direction, according to the present embodiment.

When the image forming unit 100 is viewed from the main scanning direction (Y direction), as illustrated in FIG. 9, the microlens array 23 has a bent shape where the concave surface faces the reflection plane 2101. The degree of bending of the microlens array 23 in the main scanning direction is indicated by a radius of curvature Rm. As illustrated in FIG. 9, it is desired that a scanning line 239 of the reflection plane 2101 in the main scanning direction (X direction) have a degree of bending equivalent to the radius of curvature Rm.

The width of the reflection plane 2101 of the MEMS mirror 21 in the main scanning direction, i.e., the width of an optical deflection area where the first light beam 101 is effectively deflected and scanned in the main scanning direction, as illustrated in FIG. 9, is referred to as active width Φm.

The distance between a reference point when the reflection plane 2101 deflects and scans the first light beam 101 and the center 233 (see FIG. 5) of the intermediate image 231 formed on the microlens array 23 is referred to as scanning distance L.

Figure 10:
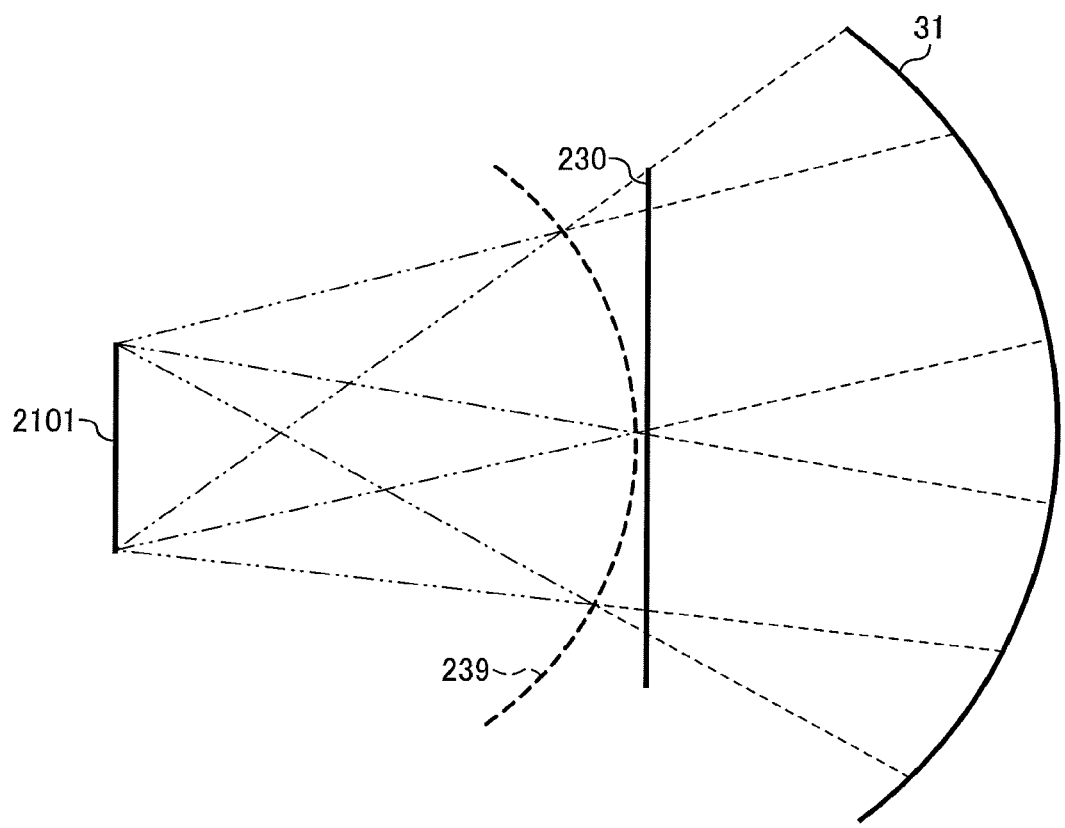
FIG. 10 is a diagram illustrating the optical arrangement of a known image forming unit when viewed from the main scanning direction, which is a control sample of the image forming unit of FIG. 1.

A control sample of the image forming unit 100 is illustrated in FIG. 10 for the purpose of describing the features of the image forming unit 100. FIG. 10 is a diagram illustrating the optical arrangement of a known image forming unit when viewed from the main scanning direction, which is a control sample of the image forming unit 100. The scanning line 239 of the reflection plane 2101 is bent in the main scanning direction. If the intermediate image forming unit has a planar shape in the main scanning direction like a microlens array 230 illustrated in FIG. 10, field curvature occurs. In order to correct such field curvature, an optical element with power has to be disposed between the reflection plane 2101 and the microlens array 230. If such an optical element with power is disposed, the beam spot diameter in the image forming unit 100 increases. If the beam spot diameter in the image forming unit 100 increases, the resolution deteriorates. In other words, if the intermediate image forming unit has a planar shape like the microlens array 230 as illustrated in FIG. 10, the image quality of the intermediate image 231 deteriorates.

In order to avoid such a situation, as illustrated in FIG. 9, the microlens array 23 that has a bent shape in the main scanning direction is used as the intermediate image forming unit according to the present embodiment. Accordingly, without disposing an optical element with power between the reflection plane 2101 and the microlens array 23, the occurrence of field curvature can be prevented. In other words, the deterioration of the resolution or image quality of the intermediate image 231 can be prevented without increasing the beam spot diameter of the second light beam 102 on the imaging plane.

In this disclosure, the image forming unit 100 satisfies Conditional Expression 1 below. Moreover, the image forming unit 100 satisfies Conditional Expression 2 below. Further, the image forming unit 100 satisfies Conditional Expression 3 below.

$0.3 < Rm/L < 3$  <Conditional Expression 1>

$0.5 \times 10^{-2} < \Phi m/L < 3 \times 10^{-2}$  <Conditional Expression 2>

$0.5 < Bm/\Phi m < 0.9$  <Conditional Expression 3>

Figure 12:
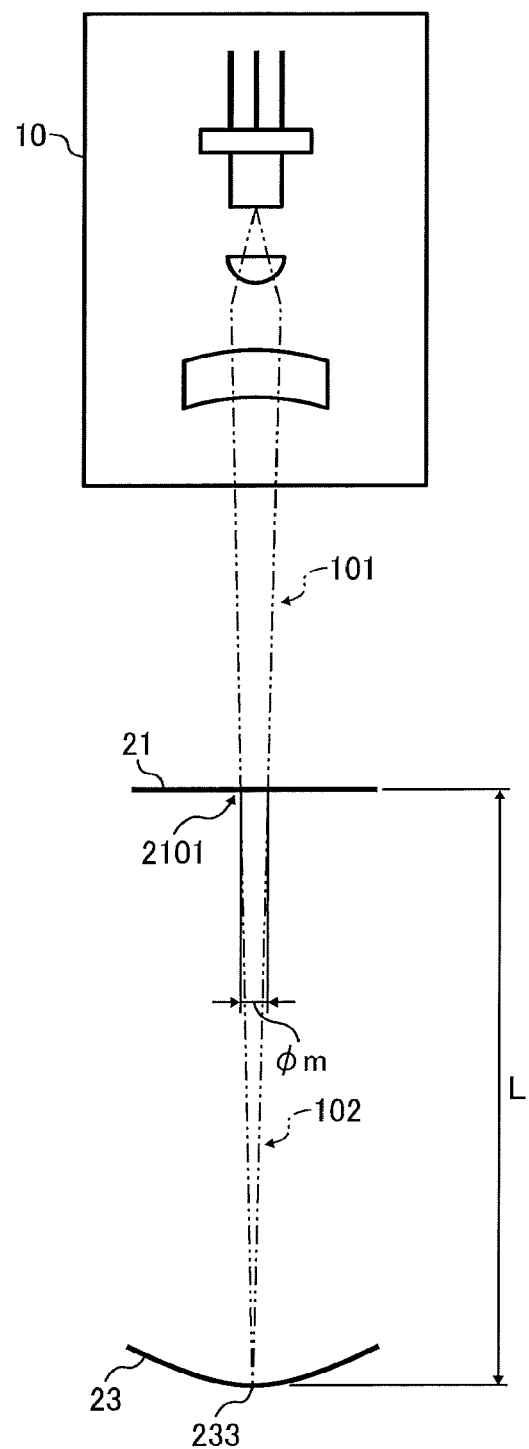
FIG. 12 is a diagram illustrating the optical path of an image forming unit according to the image display apparatus of FIG. 1.

FIG. 12 is a diagram illustrating the optical path of the image forming unit 100 of the image display apparatus of FIG. 1, according to the present embodiment.

As illustrated in FIG. 12, the first light beam 101 that is emitted from the light source unit 10 reaches the microlens array 23 that serves as an intermediate image forming unit, through the reflection plane 2101 of the MEMS mirror 21 that serves as an optical scanner. The beam spot diameter of the second light beam 102 that enters the microlens array 23 varies according to the active width $\Phi m$ of the reflection plane 2101 and the scanning distance L equivalent to the distance between the reflection plane 2101 and the center 233 of the intermediate image 231.

<Conditional Expression 1>

When the ratio of the radius of curvature Rm to the scanning distance L falls below 0.3 in the image forming unit 100 or when the above ratio goes beyond 3, the field curvature increases. Accordingly, the beam spot diameter on the microlens array 23 increases, and such an increase leads to deterioration in the resolution of the intermediate image 231. Moreover, production of a speckle pattern leads to deterioration in the image quality.

In the image forming unit 100, the microlens array 23 is bent in a convex shape on the concave mirror 31 side that makes up the observation optical system 30. Accordingly, without disposing an optical element with power between the reflection plane 2101 and the microlens array 23, desired optical properties can be achieved. As such an optical element with power does not have to be disposed as above, the HUD 1 can be downsized.

<Conditional Expression 2>

When the Conditional Expression 2 is not satisfied and the ratio of the active width $\Phi m$ to the scanning distance L falls below $0.5 \times 10^{-2}$ in the image forming unit 100, the scanning distance L is too long or the active width $\Phi m$ is too small. When the scanning distance L is too long, it may become an impediment to downsizing the HUD 1. When the active width $\Phi m$ is too small, the beam spot diameter on the microlens array 23 increases. Accordingly, when $\Phi m/L$ drops below the lower limit of the Conditional Expression 2 in the image forming unit 100, it is difficult to downsize the HUD 1, and the image quality of the intermediate image 231 deteriorates.

Typically, the beam spot diameter on the microlens array 23 is decreased to improve the image quality of the intermediate image 231. Focusing only on how to decrease the beam spot diameter on the microlens array 23, what all has to be done is to increase the active width $\Phi m$. However, the size of the micromirror 210 increases if the active width $\Phi m$ is increased. In such a configuration, the size of the reflection plane 2101 that operates when the first light beam 101 is two-dimensionally deflected and scanned increases, and such an increase makes it difficult to produce the MEMS mirror 21. Moreover, the air resistance increases when the micromirror 210 operates, and the speed of the deflecting operation becomes slow. Accordingly, the frame rate decreases. In other words, the speed with which the intermediate image 231 is formed becomes slow.

On the other hand, when the scanning distance L is shortened and the ratio of the active width $\Phi m$ to the scanning distance L goes beyond the upper limit of the Conditional Expression 2 ($3 \times 10^{-2}$), the optical path length to the microlens array 23 becomes short. In such cases, in order to ensure the scanning width on the microlens array 23, the swing angle (angle of view) of the reflection plane 2101 have to be increased. If the angle of view of the reflection plane 2101 is increased, the failure of the MEMS mirror 21 increases. Otherwise, the width of the reflection plane 2101 of the micromirror 210 increases in the main scanning direction, and such an increase makes it difficult to produce the MEMS mirror 21.

<Conditional Expression 3>

The Conditional Expression 3 defines the index for the area of the reflection plane 2101 to be used for two-dimensional deflecting and scanning. In view of the production challenges of the MEMS mirror 21, the air resistance of the reflection plane 2101 when the MEMS mirror 21 is driven, or the like, it is desired that the active width $\Phi m$ be smaller as much as possible. However, if the active width $\Phi m$ is made smaller than the lower limit in the Conditional Expression 3, the beam spot diameter on the microlens array 23 tends to increase. When the beam spot diameter increases, such an increase leads to deterioration in the resolution of the intermediate image 231. Moreover, a speckle pattern is produced on the intermediate image 231, and the image quality deteriorates.

In order to reduce the beam spot diameter on the microlens array 23, it is desired that the entire area of the reflection plane 2101 be used to reflect the first light beam 101. In other words, when the beam spot diameter of the second light beam 102 on the light exiting side is equivalent to the diameter of the entire area of the reflection plane 2101, it becomes easy to reduce the beam spot diameter on the microlens array 23.

However, if the active width $\Phi m$ goes beyond the upper limit in the Conditional Expression 3, the optical axis of the first light beam 101 becomes misaligned when the operating environment of the HUD 1 changes. In such cases, vignetting tends to occur to the first light beam 101 due to the reflection plane 2101. Here, the changes in the operating environment of the HUD 1 indicate, for example, temperature rise at a position where the image forming unit 100 is installed and misalignment of the optical axis of the first light beam 101 due to changes over time or the like. When vignetting occurs to the first light beam 101 due to the reflection plane 2101, some of the second light beam 102 is lost, and the light quantity of the intermediate image 231 decreases. If the light quantity of the intermediate image 231 decreases, the brightness of the intermediate image 231 decreases. Moreover, the white balance of the intermediate image 231 turns bad. If the brightness of the intermediate image 231 decreases or the white balance of the intermediate image 231 turns bad, the image quality of the virtual image 2 deteriorates.

For this reason, assuming that the diameter of the light on the reflection plane 2101 that heads for the center of the microlens array 23 is a beam spot diameter Bm, it is desired in the design that the ratio of the beam spot diameter Bm to the active width Φm of the reflection plane 2101 in the main scanning direction be in range from 0.5 to 0.9. In other words, it is desired that Bm/Φm satisfy the Conditional Expression 3. Here, the beam spot diameter indicates the diameter in $1/e^2$.

<First Example>

Next, an example of the image display apparatus according to an embodiment of the present invention is described. Example numerical values are given below where the optical elements of the image forming unit 100 provided for the HUD 1 satisfy the Conditional Expression 1 to the Conditional Expression 3 as above. Table 1 indicates example numerical values according to the first example.

TABLE 1

|  |  | First Example |
|---|---|---|
| Rm | [mm] | 30 |
| L | [mm] | 50 |
| Φm | [mm] | 1 |
| Bm | [mm] | 0.71 |
| θm | [degree] | 8.79 |
| Conditional Expression 1 |  | 0.60 |
| Conditional Expression 2 |  | 200E−02 |
| Conditional Expression 3 |  | 0.71 |

When the radius of curvature Rm, the scanning distance L, the active width Φm, the beam spot diameter Bm, and a half angle of view θm of the reflection plane 2101 are specified as depicted in the Table 1, the image forming unit 100 according to the first example satisfies all the Conditional Expression 1 to Conditional Expression 3.

In other words, the HUD 1 that is provided with the image forming unit 100 according to the first example can prevent the intermediate image 231 from being distorted without using an optical element that corrects the distortion on the imaging plane. Accordingly, the HUD 1 according to the first example can easily be downsized compared with the known HUDs.

Moreover, the beam spot diameter on the microlens array 23 that serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

<Second Example>

Next, an alternative embodiment of the image display apparatus according to the embodiment of the present invention is described. Table 2 indicates example numerical values according to the second example.

TABLE 2

|  |  | Second Example |
|---|---|---|
| Rm | [mm] | 65 |
| L | [mm] | 50 |
| Φm | [mm] | 1 |
| Bm | [mm] | 0.71 |
| θm | [degree] | 8.46 |
| Conditional Expression 1 |  | 1.30 |
| Conditional Expression 2 |  | 200E−02 |
| Conditional Expression 3 |  | 0.71 |

When the radius of curvature Rm, the scanning distance L, the active width Φm, the beam spot diameter Bm, and the half angle of view θm of the reflection plane 2101 are specified as depicted in the Table 2, the image forming unit 100 according to the second example satisfies all the Conditional Expression 1 to Conditional Expression 3.

In other words, the HUD 1 that is provided with the image forming unit 100 according to the second example can prevent the intermediate image 231 from being distorted without using an optical element that corrects the distortion on the imaging plane. Accordingly, the HUD 1 according to the second example can easily be downsized compared with the known HUDs.

Moreover, the beam spot diameter on the microlens array 23 hat serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

<Third Example>

Next, a further alternative embodiment of the image display apparatus according to the embodiment of the present invention is described. Table 3 indicates example numerical values according to the third example.

TABLE 3

|  |  | Third Example |
|---|---|---|
| Rm | [mm] | 120 |
| L | [mm] | 50 |
| Φm | [mm] | 1 |
| Bm | [mm] | 0.71 |
| θm | [degree] | 8.46 |
| Conditional Expression 1 |  | 2.40 |
| Conditional Expression 2 |  | 200E−02 |
| Conditional Expression 3 |  | 0.71 |

When the radius of curvature Rm, the scanning distance L, the active width Φm, the beam spot diameter Bm, and the half angle of view θm of the reflection plane 2101 are specified as depicted in the Table 3, the image forming unit 100 according to the third example satisfies all the Conditional Expression 1 to Conditional Expression 3.

In other words, the HUD 1 that is provided with the image forming unit 100 according to the third example can prevent the intermediate image 231 from being distorted without using an optical element that corrects the distortion on the imaging plane. Accordingly, the HUD 1 according to the third example can easily be downsized compared with the known HUDs.

Moreover, the beam spot diameter on the microlens array 23 that serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

<Fourth Example>

Next, a further alternative embodiment of the image display apparatus according to the embodiment of the present invention is described. Table 4 indicates example numerical values according to the fourth example.

TABLE 4

|  |  | Fourth Example |
|---|---|---|
| Rm | [mm] | 30 |
| L | [mm] | 65 |
| Φm | [mm] | 1 |
| Bm | [mm] | 0.71 |
| θm | [degree] | 6.77 |
| Conditional Expression 1 |  | 0.46 |
| Conditional Expression 2 |  | 154E−02 |
| Conditional Expression 3 |  | 0.71 |

When the radius of curvature Rm, the scanning distance L, the active width Φm, the beam spot diameter Bm, and the half angle of view θm of the reflection plane 2101 are specified as depicted in the Table 4, the image forming unit 100 according to the fourth example satisfies all the Conditional Expression 1 to Conditional Expression 3.

In other words, the HUD 1 that is provided with the image forming unit 100 according to the fourth example can prevent the intermediate image 231 from being distorted without using an optical element that corrects the distortion on the imaging plane. Accordingly, the HUD 1 according to the fourth example can easily be downsized compared with the known HUDs.

Moreover, the beam spot diameter on the microlens array 23 that serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

<Fifth Example>

Next, a further alternative embodiment of the image display apparatus according to the embodiment of the present invention is described. Table 5 indicates example numerical values according to the fifth example.

TABLE 5

|  |  | Fifth Example |
|---|---|---|
| Rm | [mm] | 65 |
| L | [mm] | 65 |
| Φm | [mm] | 1 |
| Bm | [mm] | 0.71 |
| θm | [degree] | 6.57 |
| Conditional Expression 1 |  | 1.00 |
| Conditional Expression 2 |  | 1.54E−02 |
| Conditional Expression 3 |  | 0.71 |

When the radius of curvature Rm, the scanning distance L, the active width Φm, the beam spot diameter Bm, and the half angle of view θm of the reflection plane 2101 are specified as depicted in the Table 5, the image forming unit 100 according to the fifth example satisfies all the Conditional Expression 1 to Conditional Expression 3.

In other words, the HUD 1 that is provided with the image forming unit 100 according to the fifth example can prevent the intermediate image 231 from being distorted without using an optical element that corrects the distortion on the imaging plane. Accordingly, the HUD 1 according to the fifth example can easily be downsized compared with the known HUDs.

Moreover, the beam spot diameter on the microlens array 23 that serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

<Sixth Example>

Next, a further alternative embodiment of the image display apparatus according to the embodiment of the present invention is described. Table 6 indicates example numerical values according to the sixth example.

TABLE 6

|  |  | Sixth Example |
|---|---|---|
| Rm | [mm] | 120 |
| L | [mm] | 65 |
| Φm | [mm] | 1 |
| Bm | [mm] | 0.71 |
| θm | [degree] | 6.5 |

TABLE 6-continued

|  | Sixth Example |
| --- | --- |
| Conditional Expression 1 | 1.85 |
| Conditional Expression 2 | 1.54E−02 |
| Conditional Expression 3 | 0.71 |

When the radius of curvature Rm, the scanning distance L, the active width Φm, the beam spot diameter Bm, and the half angle of view θm of the reflection plane 2101 are specified as depicted in the Table 6, the image forming unit 100 according to the sixth example satisfies all the Conditional Expression 1 to Conditional Expression 3.

In other words, the HUD 1 that is provided with the image forming unit 100 according to the sixth example can prevent the intermediate image 231 from being distorted without using an optical element that corrects the distortion on the imaging plane. Accordingly, the HUD 1 according to the sixth example can easily be downsized compared with the known HUDs.

Moreover, the beam spot diameter on the microlens array 23 that serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

<Seventh Example>

Next, a further alternative embodiment of the image display apparatus according to the embodiment of the present invention is described. Table 7 indicates example numerical values according to the seventh example.

TABLE 7

|  |  | Seventh Example |
| --- | --- | --- |
| Rm | [mm] | 30 |
| L | [mm] | 80 |
| Φm | [mm] | 1 |
| Bm | [mm] | 0.71 |
| θm | [degree] | 5.42 |
| Conditional Expression 1 |  | 0.38 |
| Conditional Expression 2 |  | 1.25E−02 |
| Conditional Expression 3 |  | 0.71 |

When the radius of curvature Rm, the scanning distance L, the active width Φm, the beam spot diameter Bm, and the half angle of view θm of the reflection plane 2101 are specified as depicted in the Table 7, the image forming unit 100 according to the seventh example satisfies all the Conditional Expression 1 to Conditional Expression 3.

In other words, the HUD 1 that is provided with the image forming unit 100 according to the seventh example can prevent the intermediate image 231 from being distorted without using an optical element that corrects the distortion on the imaging plane. Accordingly, the HUD 1 according to the seventh example can easily be downsized compared with the known HUDs.

Moreover, the beam spot diameter on the microlens array 23 that serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

<Eighth Example>

Next, a further alternative embodiment of the image display apparatus according to the embodiment of the present invention is described. Table 8 indicates example numerical values according to the eighth example.

TABLE 8

|  |  | Eighth Example |
| --- | --- | --- |
| Rm | [mm] | 65 |
| L | [mm] | 80 |
| Φm | [mm] | 1 |
| Bm | [mm] | 0.71 |
| θm | [degree] | 5.29 |
| Conditional Expression 1 |  | 0.81 |
| Conditional Expression 2 |  | 1.25E−02 |
| Conditional Expression 3 |  | 0.71 |

When the radius of curvature Rm, the scanning distance L, the active width Φm, the beam spot diameter Bm, and the half angle of view θm of the reflection plane 2101 are specified as depicted in the Table 8, the image forming unit 100 according to the eighth example satisfies all the Conditional Expression 1 to Conditional Expression 3.

In other words, the HUD 1 that is provided with the image forming unit 100 according to the eighth example can prevent the intermediate image 231 from being distorted without using an optical element that corrects the distortion on the imaging plane. Accordingly, the HUD 1 according to the eighth example can easily be downsized compared with the known HUDs.

Moreover, the beam spot diameter on the microlens array 23 that serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

<Ninth Example>

Next, a further alternative embodiment of the image display apparatus according to the embodiment of the present invention is described. Table 9 indicates example numerical values according to the ninth example.

TABLE 9

|  |  | Second Example |
|---|---|---|
| Rm | [mm] | 120 |
| L | [mm] | 80 |
| Φm | [mm] | 1 |
| Bm | [mm] | 0.71 |
| θm | [degree] | 5.25 |
| Conditional Expression 1 |  | 1.50 |
| Conditional Expression 2 |  | 1.25E−02 |
| Conditional Expression 3 |  | 0.71 |

When the radius of curvature Rm, the scanning distance L, the active width Φm, the beam spot diameter Bm, and the half angle of view θm of the reflection plane 2101 are specified as depicted in the Table 9, the image forming unit 100 according to the ninth example satisfies all the Conditional Expression 1 to Conditional Expression 3.

In other words, the HUD 1 that is provided with the image forming unit 100 according to the ninth example can prevent the intermediate image 231 from being distorted without using an optical element that corrects the distortion on the imaging plane. Accordingly, the HUD 1 according to the ninth example can easily be downsized compared with the known HUDs.

Moreover, the beam spot diameter on the microlens array 23 that serves as an intermediate image forming unit is reduced, and the balance between the beam spot diameter on the microlens array 23 and the reflection plane 2101 provided for the MEMS mirror 21 is maintained. Accordingly, a reduction in the image quality or the occurrence of a speckle pattern can be prevented, and a reduction in the frame rate can also be prevented.

Moreover, vignetting that occurs to the first light beam 101 by the reflection plane 2101 due to changes in use environment or changes over time can be prevented. Accordingly, the image quality of the intermediate image 231 improves, and a reduction in the brightness of the intermediate image 231 or an adverse effect such as a loss in white balance can be prevented.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image display apparatus comprising:
an image forming unit comprising:
a light source unit to emit light;
an optical scanner to scan the light emitted from the light source unit two-dimensionally in a main scanning direction and a sub-scanning direction: and
an intermediate image forming unit to form an intermediate image by the light scanned by the optical scanner,
wherein
the image forming unit satisfies $$0.3 < Rm/L < 3,$$

where
Rm denotes a radius of curvature of the intermediate image forming unit in the main scanning direction, and L denotes distance between a reference point when the optical scanner deflects and scans the light and a center of the intermediate image formed on the intermediate image forming unit, and
the image forming unit satisfies $$0.5 \times 10^{-2} < \Phi m/L < 3 \times 10^{-2},$$

where Φm denotes width of an effective optical deflection area of the optical scanner in the main scanning direction.

2. The image display apparatus according to claim 1, wherein
the image forming unit satisfies $$0.5 < Bm/\Phi m < 0.9,$$

where Bm denotes a beam spot diameter of the light emitted from an effective optical deflection area of the optical scanner in the main scanning direction, and
Φm denotes width of an effective optical deflection area of the optical scanner in the main scanning direction.

3. The image display apparatus according to claim 1, wherein
the intermediate image forming unit is a microlens array.

4. The image display apparatus according to claim 1, wherein
the optical scanner includes a micromirror having a reflection plane directed to the main scanning direction and the sub-scanning direction.

5. The image display apparatus according to claim 1, further comprising
a flat reflector disposed between the optical scanner and the intermediate image forming unit.

6. The image display apparatus according to claim 1, wherein
the image forming unit is free of an optical element with power between the optical scanner and the intermediate image forming unit.

7. An image display apparatus comprising:
an image forming unit comprising:
a light source unit to emit light;
an optical scanner to scan the light emitted from the light source unit two-dimensionally in a main scanning direction and a sub-scanning direction; and
an intermediate image forming unit to form an intermediate image by the light scanned by the optical scanner,
wherein
the image forming unit satisfies $$0.3 < Rm/L < 3,$$

where
Rm denotes a radius of curvature of the intermediate image forming unit in the main scanning direction, and L denotes distance between a reference point when the optical scanner deflects and scans the light and a center of the intermediate image formed on the intermediate image forming unit
the image forming unit satisfies $$0.5 < Bm/\Phi m < 0.9,$$

where Bm denotes a beam spot diameter of the light emitted from an effective optical deflection area of the optical scanner in the main scanning direction.

8. The image display apparatus according to claim 7, wherein
the intermediate image forming unit is a microlens array.

9. The image display apparatus according to claim 7, wherein
the optical scanner includes a micromirror having a reflection plane directed to the main scanning direction and the sub-scanning direction.

10. The image display apparatus according to claim 7, further comprising
a flat reflector disposed between the optical scanner and the intermediate image forming unit.

11. A vehicle comprising:
an image display apparatus comprising:
an image forming unit comprising:
a light source unit to emit light;
an optical scanner to scan the light emitted from the light source unit two-dimensionally in a main scanning direction and a sub-scanning direction; and
an intermediate image forming unit to form an intermediate image by the light scanned by the optical scanner,
wherein the image forming unit satisfies $$0.3 < Rm/L < 3,$$

where
Rm denotes a radius of curvature of the intermediate image forming unit in the main scanning direction, and
L denotes distance between a reference point when the optical scanner deflects and scans the light and a center of the intermediate image formed on the intermediate image forming unit,
wherein the image forming unit satisfies $$0.5 \times 10^{-2} < \Phi m/L < 3 \times 10^{-2},$$

where $\Phi m$ denotes width of an effective optical deflection area of the optical scanner in the main scanning direction, and
wherein the image display apparatus indicates the intermediate image to a driver as a virtual image.

12. The vehicle according to claim 11, wherein
the image forming unit is free of an optical element with power between the optical scanner and the intermediate image forming unit.

* * * * *